United States Patent Office

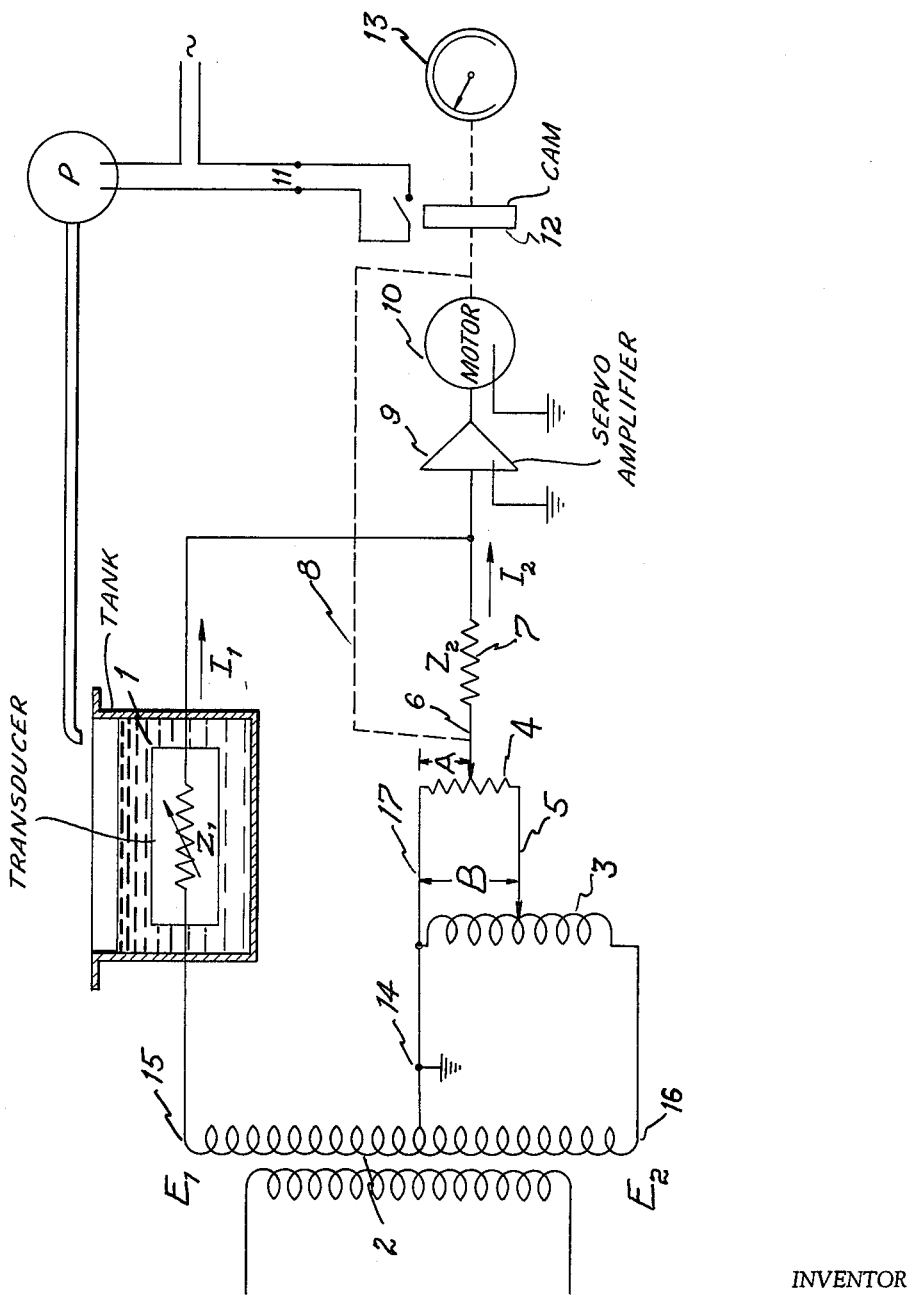

3,221,316
Patented Nov. 30, 1965

3,221,316
LOAD LIMIT CONTROL
Marvin S. Halpern, Riverdale, N.Y., assignor to Simmonds Precision Products, Inc., Tarrytown, N.Y., a corporation of New York
Filed Apr. 13, 1961, Ser. No. 102,723
1 Claim. (Cl. 340—180)

This invention relates to a telemetering control system automatic in operation and which governs an external function according to a predetermined condition.

In many fueling operations, for instance, the degree of control necessary to deliver the required amount of fuel is highly critical. The most satisfactory method of obtaining such control is through the use of electrical actuating and control circuitry. Such a control system is desirable from the standpoint of speed and reliability. The presently known and available control circuits are not, however, automatic in operation nor do they exhibit the high degree of sensitivity required in critical fueling operations.

It is, therefore, an object of this invention to provide an automatic telemetering system for use in controlling an external switching function.

It is a further object of this invention to provide a bridge circuit with associated servo-mechanisms which operates to provide a highly sensitive system for controlling an external switching function.

It is a still further object of this invention to provide an automatic telemetering control system responsive to a pre-set condition and which reaches a null point upon the attainment of that condition.

In a use of this invention, a desired amount of fuel is manually set by a variable circuit parameter which is part of a bridge circuit included in the system. Fuel is caused to flow until an additional circuit element position corresponds to the aforesaid setting and the bridge network is balanced. Upon the attainment of the null point, the desired amount of fuel has been transferred and the pumping apparatus is automatically deactivated.

Various other objects, advantages and features of the invention will become apparent from the following detailed description taken in conjunction with the accompanying drawing in which the combination block and schematic diagram illustrates a representative system in which this invention is utilized.

Referring to the drawing, it will be seen that the system of the invention includes a variable impedance 1, which is also represented as $Z_1$ for purposes of a circuit analysis which will be discussed more fully hereinafter. Impedance 1 is the transducer or tank unit in a fueling system, the latter being the preferred environment for a use of this invention. Transformer secondary 2 will be recognized by those versed in the electrical arts as being the voltage supply means for the control system. This voltage supply is connected to the transformer primary (not shown). For the purpose of rendering a clear description of this invention, it only becomes necessary to disclose secondary 2 with its associated voltages $E_1$ and $E_2$ and the grounded center-tap 14. Autotransformer 3 is shown connected between points 14 and 16 of secondary 2. The autotransformer 3 output is connected to potentiometer 4 through line 17 and movable contact 5. Movable contact 6 serves as the interconnecting means between potentiometer 4 and impedance 7 ($Z_2$). Impedances 1 and 7 are both attached to the servo-amplifier 9.

Servo-amplifier 9 may be of any of the several well-known types and functions to supply amplified signals to the motor 10 of the servo system. The output of motor 10 is ganged to movable contact 6 with means shown in the drawing as a broken line 8. It will thus be apparent that the output from motor 10 results in a movement of contact 6 corresponding to such output. Motor 10 is also associated with cam 12 and indicator 13 of the system.

Cam 12 and microswitch 11 are both mounted in indicator 13 but, in order to give a clearer description of the invention, these elements are shown in expanded diagrammatic form. Indicator 13 is attached to the transducer or fuel tank unit and operates to meter the amount of fuel present in such tank unit. Cam 12 is set to close microswitch 11 when the scale reading of indicator 13 registers full. As indicated hereinbefore, cam 12 is associated with the output of motor 10 and rotation of the motor 10 consequently results in a corresponding movement of the cam 12.

The operation of this telemetering control system will be more readily understood with an analysis of the circuitry included therein. With reference to the illustrated circuit parameters, The servo system error signal $I_1-I_2$ at a null $$\frac{E_1}{Z_1}=\frac{AE_3}{Z_2}$$

where A is a percentage of rebalancing potentiometer 4.
As a bridge rebalancing system, $$E_1=E_2=E_3$$

hence $$A=\frac{Z_2}{Z_1}$$

As a limit control system, $A=1$ at a null, therefore, $$\frac{E_3}{Z_2}=\frac{E_1}{Z_1}$$

and, $$\frac{Z_1}{Z_2}=\frac{E_1}{E_3}$$

The ratio $Z_1/Z_2$ is the limit being controlled.

$$E_3=BE_2$$

B is the percentage of maximum of autotransformer 3.

$$\frac{Z_2}{Z_1}=\frac{BE_2}{E_1}$$

Since $$E_2=E_2$$

$$\frac{Z_2}{Z_1}=B$$

The system is calibrated so that the scale of indicator 13 reads full when the fuel tank unit is full and the autotransformer output is at maximum. As shown by the above analysis, the scale of the indicator 13 will register full capacity when the fuel in the tank unit is the same percentage of full as the percent of maximum setting (B) of the autotransformer. Rebalancing to a null occurs with rebalancing potentiometer 4 at maximum at each percent setting because of the reduced voltage from the autotransformer tap 5 driving less current $I_2$ to the rebalancing potentiometer 4. Therefore, in a fueling operation, the autotransformer contact 5 is set to the required percentage. The voltage output of the autotransformer energizes the servo amplifier and motor. The servo motor, in turn, operates to actuate both cam 12 and potentiometer 4 through the associated movable contact 6. The resulting resistance variation in potentiometer 4 causes the bridge network to seek a null point. Upon the establishment of the null, the bridge ceases to produce an output and, simultaneously therewith, the level of fuel in the tank unit reaches the percentage established by contact 5 and, accordingly, indicator 13 will register that a full condition exists, thereby causing cam 12 to close microswitch 11. The contacts of microswitch 11 may be placed in an electrical circuit (not shown) which controls the fuel pump (also not shown). It, therefore, is apparent that the system becomes completely automatic since there is no need to monitor the indicator 13.

It will be evident that an object of the invention has been achieved in providing an extremely sensitive load limit control which is automatic in operation.

While the invention has been described in connection with the preferred environment, it is to be understood that this description is illustrative only and is not intended to limit the invention.

I claim:

A telemetering system comprising a bridge network having a transformer secondary with first and second ends and a tap, a node, impedance transducer means connecting said first end to said node, an autotransformer connected between said second end and said tap, said autotransformer providing an adjustable output, a rebalance potentiometer having a movable contact, means connecting said potentiometer to said autotransformer output, impedance means connecting said movable contact to said node, a motor having a rotatable shaft, said motor moving said movable contact to balance said bridge network, servo amplifier means connected to said node for controlling said motor, an indicator moved by said motor shaft for indicating the condition sensed by said transducer, and a cam on said motor shaft for actuating a switch means adjacent said cam, whereby said cam actuates said switch when a balanced condition of said bridge network is reached.

References Cited by the Examiner
UNITED STATES PATENTS

| 1,332,182 | 2/1920 | Leeds | 340—180 |
| 2,134,864 | 11/1938 | Engel | 340—187 |
| 2,730,697 | 1/1956 | Wermelskirchen | 340—187 |
| 2,872,811 | 2/1959 | Bergeson | 340—187 |
| 3,080,513 | 3/1963 | Edwards | 340—187 |

NEIL C. READ, *Primary Examiner.*

THOMAS B. HABECKER, *Examiner.*